(12) United States Patent
Onder et al.

(10) Patent No.: US 6,458,880 B1
(45) Date of Patent: Oct. 1, 2002

(54) POLYURETHANES WITH TALC CRYSTALLIZATION PROMOTER

(75) Inventors: Kemal Onder, Brecksville; George Hunter Loeber, Elyria, both of OH (US)

(73) Assignee: Noveon IP Holdings Corp., Cleveland, OH (US)

( * ) Notice: Subject to any disclaimer, the term of this patent is extended or adjusted under 35 U.S.C. 154(b) by 0 days.

(21) Appl. No.: 09/419,992

(22) Filed: Oct. 18, 1999

(51) Int. Cl.⁷ .............................. C08J 5/10; C08K 3/34; C08L 75/04
(52) U.S. Cl. ...................................... 524/451
(58) Field of Search ......................... 524/451

(56) References Cited

U.S. PATENT DOCUMENTS

| | | | |
|---|---|---|---|
| 4,501,844 A | 2/1985 | Chen et al. ................. | 524/451 |
| 4,871,789 A | * 10/1989 | Martinez .................... | 523/220 |
| 5,068,143 A | 11/1991 | Agger et al. ............... | 428/241 |
| 5,216,062 A | * 6/1993 | Lausberg et al. ........... | 524/404 |
| 5,496,880 A | 3/1996 | Heuseveldt et al. ........ | 524/417 |
| 5,679,722 A | 10/1997 | Tamura ....................... | 522/96 |

FOREIGN PATENT DOCUMENTS

| | | |
|---|---|---|
| EP | 0 624 625 A2 | 11/1994 |
| JP | 55154139 A | 12/1980 |
| JP | 56027336 A | 3/1981 |
| JP | 61025884 A | 2/1986 |
| JP | 61218507 A | 9/1986 |
| JP | 03208253 A | 9/1991 |
| JP | 3236991 A | 10/1991 |
| JP | 4132743 A | 5/1992 |
| JP | 7179045 A | 7/1995 |

\* cited by examiner

Primary Examiner—James J. Seidleck
Assistant Examiner—U. K. Rajguru
(74) Attorney, Agent, or Firm—Bruce E. Black; Valerie L. Calloway; Joe A. Powell

(57) ABSTRACT

Talc is combined with polyurethane to facilitate crystallization of a polyurethane composition, particularly a polyester-based polyurethane composition. The addition of talc can allow for more rapid formation of products by, for example, injection molding, compression molding, extrusion, and film formation techniques.

19 Claims, No Drawings

POLYURETHANES WITH TALC CRYSTALLIZATION PROMOTER

FIELD OF THE INVENTION

This invention relates to polyurethane compositions. In particular, the invention relates to polyurethane compositions that include a talc crystallization promoter.

BACKGROUND OF THE INVENTION

Polyurethanes are used in a variety of different products, including flexible or rigid foams, fibers, molded compositions, and adhesives. Polyurethanes are typically the reaction product of (a) one or more hydroxyl terminated polymers (e.g., polyols), such as hydroxyl terminated polyethers, polyesters, polycarbonates, and polycaprolactones, (b) one or more polyisocyanates, and, optionally, (c) one or more chain extenders. The properties of a particular polyurethane and its suitability for particular purposes depend, at least in part, on the reactants used to make the polyurethane.

One useful property for forming particular polyurethane products, including for example, many molded products, is the ability of some polyurethanes to crystallize. The crystallization of the polyurethane can result in a stronger, more stable, wear resistant, and/or solvent resistant product. Typically during product formation, a polyurethane must remain in a mold until the polyurethane starts to crystallize or is substantially crystallized. To have low molding cycle times, it is useful to find polyurethanes that crystallize quickly or at relatively high temperatures. Fast crystallization can also be advantageous in other processes where rapid set-up of the product is desirable including, for example, extrusion and film formation. In addition, other properties such as, for example, price, availability, color, stability, and strength should also be considered when selecting the proper polyurethane for a particular product.

SUMMARY OF THE INVENTION

Generally, the present invention relates to polyurethane compositions using talc as a crystallization promoter. One embodiment of the invention is a polyurethane composition containing polyurethane (e.g., a polyester-based polyurethane) and sufficient talc to provide a crystallization temperature of the polyurethane composition that is at least 10 degrees Celsius greater than the crystallization temperature of the polyurethane composition without talc, as measured by differential scanning calorimetry starting at a temperature of 270° C. and decreasing at a rate of 40° C. per minute. A suitable range for the amount of talc is, for example, about 0.2 to 4 wt. %, based on the total weight of the polyurethane composition.

Another embodiment is an article formed using this polyurethane composition. This article can be formed by, for example, molding or extruding the polyurethane composition.

Yet another embodiment is a method of forming the polyurethane composition described above. This method includes combining the polyurethane and the talc, typically in an extruder. The step of combining the polyurethane and the talc can include, for example, a) adding talc to a previously formed polyurethane, b) adding talc to the reactive components that are used to form the polyurethane, or c) adding talc to partially or substantially formed polyurethane in, for example, an extruder.

DETAILED DESCRIPTION OF THE PREFERRED EMBODIMENT

The present invention is directed to crystallizable polyurethane compositions that include talc as a crystallization promoter and the products made using these compositions.

The term "crystallizable" refers to compositions that are a) crystallized or b) uncrystallized, but capable of crystallization by a reduction in temperature of the composition. The crystallization temperature of the composition can typically be determined by differential scanning calorimetry. Generally, crystallized compositions can be melted, solvated, or otherwise amorphized and then recrystallized.

The term "polyurethane composition" refers to a composition, prior to extrusion, within the extruder, or after extrusion, that contains polyurethane or reagents used to make the polyurethane. When referring to the weight percentage of a particular material in the polyurethane composition based on the total weight of the polyurethane composition, the polyurethane composition includes the polyurethane, reagents used to make the polyurethane, talc, and all other additives.

The polyurethane composition typically includes (i) at least one crystallizable thermoplastic polyurethane and (ii) talc which acts as a crystallization promoter. Other additives can also be provided in the polyurethane composition. The polyurethane and the talc can be combined in a variety of ways including mixing within an extruder that is also used for the reactive formation of the polyurethane, as described below. The addition of talc to polyurethanes (e.g., polyester-based polyurethanes) can yield a polyurethane composition with a crystallization temperature that is greater than the crystallization temperature of the same polyurethane composition without talc. For example, the crystallization temperature of the polyurethane composition can be at least 10 degrees Celsius greater than a crystallization temperature of the same polyurethane composition without the talc, as measured, for example, by differential scanning calorimetery (DSC) starting at a temperature of 270° C. and decreasing at a rate of 40° C. per minute.

Polyurethanes

Polyurethanes are generally prepared by combining and reacting a) at least one hydroxyl terminated intermediate (e.g., hydroxyl terminated polyester, polyether, polycarbonate, or polycaprolactone) with b) at least one polyisocyanate and, optionally, c) at least one chain extender. These reactants generate a polyurethane in, for example, an extruder or other reaction vessel. Suitable polyurethanes include thermoplastic polyurethanes, but can also include other polyurethanes, such as thermoset polyurethanes.

The reaction that forms the polyurethane can be complete before the polyurethane is introduced into the extruder and/or before combination with the talc. Suitable commercial polyurethanes include, for example, at least some of the Estane® series of polyurethanes available from BFGoodrich (Charlotte, N.C.), such as, for example, Estane® 58157, 58142, 58137, 58133, and 58134.

Alternatively, the reactants to produce the polyurethane can be added into the extruder or other reaction vessel and the reaction performed in situ. For example, the hydroxyl terminated polymer(s), the polyisocyanate(s), and the chain extender(s), if present, can be combined within the extruder and reacted as the material flows through the extruder. Talc can be added with the reactants or at another point along the extruder.

Based on the current experimental data, the crystallization promoting effect provided by the addition of talc is particularly apparent for polyurethanes derived from hydroxyl terminated polyesters (i.e., polyester-based polyurethanes). The addition of talc to certain hydroxyl terminated polyether-based polyurethanes, as illustrated in Examples 3–7, did not appear to result in any significant increase in crystallization temperature. It is thought that these polyether-based polyurethanes did not benefit from the addition of talc because the polyether portions of the polyurethane are phase separated from the urethane portions, allowing the urethane portions to more readily crystallize. In contrast, the polyester and urethane portions of the polyester-based polyurethanes are soluble in each other and allow for phase-mixing, which inhibits crystallization. Accordingly, the remainder of the discussion is generally directed to polyester-based polyurethanes. Other polyurethanes and methods for their formation are described in U.S. Pat. Nos. 5,110,850 and 5,959,059, incorporated herein by reference.

Hydroxyl Terminated Polyesters

Hydroxyl terminated polyesters can be used to form polyurethanes. Suitable hydroxyl terminated polyesters for forming polyurethanes are generally polyesters, often linear polyesters, having a number average molecular weight, $M_n$, of at least 500 and often no more than 10,000 to provide the polyurethane with a distribution of hard and soft segments. The number average molecular weight of the hydroxyl terminated polyester is typically in the range of about 600 to about 5,000, and often in the range of about 700 to about 4,000. The number average molecular weight can be determined by assay of the number of terminal functional groups for a given weight of polymer. Suitable hydroxyl terminated polyesters generally have an acid number of 1.3 or less and typically 0.8 or less. The acid number refers to the number of milligrams of potassium hydroxide needed to neutralize one gram of the hydroxyl terminated polyester. Hydroxyl terminated polyesters are commercially available from companies such as, for example, Witco Corp. (Perth Amboy, N.J.), Inolex Chemical Co. (Philadelphia, Pa.), and Ruco Polymer Corp. (Hicksville, N.Y.).

The hydroxyl terminated polyester polymers can be produced by, for example, (1) an esterification reaction of one or more dicarboxylic acids or anhydrides using one or more glycols or (2) a transesterification reaction of one or more esters of dicarboxylic acids using one or more glycols. Mole ratios generally in excess of more than one mole of glycol to acid, anhydride, or ester are preferred so as to obtain linear chains having a preponderance of terminal hydroxyl groups.

Suitable dicarboxylic acids for preparing a hydroxyl terminated polyester intermediate include aliphatic, cycloaliphatic, and aromatic dicarboxylic acids. A single dicarboxylic acid or a combination of dicarboxylic acids can be used. Typically, the dicarboxylic acids have a total of from 4 to 15 carbon atoms. Examples of suitable dicarboxylic acids include succinic, glutaric, adipic, pimelic, suberic, azelaic, sebacic, dodecanedioic, isophthalic, terephthalic, and cyclohexane dicarboxylic acids, and the like. Anhydrides of the above dicarboxylic acids, such as phthalic anhydride, tetrahydrophthalic anhydride, and the like, can also be used. Adipic acid is a commonly used dicarboxylic acid.

If the transesterification route for formation of the hydroxyl terminated polyester is utilized, esters of the dicarboxylic acids described above can be used. These esters typically include an alkyl group, usually having 1 to 6 carbon atoms, in place of the acidic hydrogen of the corresponding acid functionalities.

The glycols which are reacted to form the hydroxyl terminated polyester intermediate can be aliphatic, aromatic, or combinations thereof. The glycols typically have a total of from 2 to 12 carbon atoms. Suitable glycols include, for example, ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, and the like. Commonly used glycols include 1,4-butanediol and 1,6-hexanediol.

Polyisocyanates

Polyisocyanates are another component used in the formation of polyurethanes. Polyisocyanates are commercially available from companies such as, for example, Dow Chemical Co. (Midland, Mich.), BASF Corp. (Parsippany, N.J.), Bayer AG (Leverkusen, Germany), and ICI Americas, Inc. (Wilmington, Del.). Suitable polyisocyanates for forming polyurethanes include aromatic and aliphatic diisocyanates. Examples of suitable aromatic diisocyanates include para,para'-4,4'-methylenebis-(phenyl isocyanate) (MDI), ortho,para'-4,4'-methylenebis-(phenyl isocyanate), m-xylylene diisocyanate (XDI), m-tetramethyl xylylene diisocyanate (TMXDI), phenylene-1,4-diisocyanate (PPDI), 1,5-naphthalene diisocyanate (NDI), diphenylmethane-3,3'-dimethoxy-4,4'-diisocyanate (TODI), and toluene diisocyanate (TDI). Examples of suitable aliphatic diisocyanates include isophorone diisocyanate (IPDI), 1,4-cyclohexyl diisocyanate (CHDI), hexamethylene diisocyanate (HDI), 1,6-diisocyanato-2,2,4,4-tetramethyl hexane (TMDI), 1,3-bis(isocyanato-methyl)cyclohexane (HXDI), 1,10-decane diisocyanate, and trans-dicyclohexylmethane diisocyanate (HMDI). A commonly used diisocyanate is 4,4'-methylenebis(phenyl isocyanate) (MDI). A single polyisocyanate or a combination of polyisocyanates can be used.

The choice of polyisocyanate used in forming the polyurethane can determine, at least in part, how easily the polyurethane is crystallizable. For example, polyurethanes made using TDI or IPDI typically are not easily crystallizable due, at least in part, to the asymmetric relationship of the isocyanate functional groups of these polyisocyanates. In contrast, polyurethanes made using, for example, MDI, PPDI, NDI, CHDI, and HMDI, where the isocyanate groups are symmetrically disposed, are often more readily crystallized.

The mole ratio of diisocyanate functional groups (from the polyisocyanate) to hydroxyl functional groups (from the hydroxyl terminated polyol) is generally selected to be at least 0.95:1 and generally no more than about 1.10:1. Typically, the mole ratio of diisocyanate:hydroxyl functional groups is selected to be in the range of about 0.96:1 to about 1.02:1 and often in the range of about 0.97:1 to about 1.005:1.

Chain Extenders

Chain extenders can be added to the other reactants to increase the molecular weight of the polyurethane, although some polyurethanes are formed without chain extenders. Suitable chain extenders include, for example, lower aliphatic or short chain glycols having about 2 to about 10 carbon atoms. Examples of suitable chain extenders include diethylene glycol, propylene glycol, dipropylene glycol, 1,4-butanediol, 1,6-hexanediol, 1,3-butanediol, 1,5-pentanediol, 1,4-cyclohexanedimethanol hydroquinone di(hydroxyethyl) ether, neopentyl glycol, and the like. Preferred chain extenders are linear aliphatic diols with hydroxyl groups at each end of the molecule. A commonly used chain extender is 1,4-butanediol. A single chain extender or a combination of chain extenders can be used. Commercial sources of chain extenders include, for example, Lyondell Chemical Corp. (Houston, Tex.) and BASF Corp. (Parsippany, N.J.).

When a chain extender is used, at least about 0.1 moles of chain extender per mole of hydroxyl terminated intermediate (e.g., hydroxyl terminated polyester, polyether, polycarbonate, and/or polycaprolactone intermediate) is used. In some instances, twenty or more moles of chain extender can be used per mole of hydroxyl terminated intermediate. Typically about 0.5 to 20 moles of chain extender per mole of hydroxyl terminated intermediate is used.

Formation of the Polyurethane

The polyurethane is generally made from the reaction of a) one or more hydroxyl terminated intermediates (e.g., hydroxyl terminated polyesters), b) one or more polyisocyanates, and, optionally, c) one or more chain extenders. The formation of the polyurethane can be a simultaneous co-reaction of the hydroxyl terminated intermediate(s), polyisocyanate(s), and chain extender(s) to produce a polyurethane. In this one-shot polymerization process, which generally occurs in situ in an extruder or other device, a simultaneous reaction occurs between the two or three components (e.g., the hydroxyl terminated intermediate(s), the polyisocyanate(s), and, typically, the chain extender(s)). The reaction is generally initiated at temperatures of from about 100° C. to about 140° C.; however, because the reaction is exothermic, the reaction temperature generally increases to about 170° C. to 270° C. Polyurethanes can decompose at higher temperatures (e.g., above 270° C.). Another method of forming polyurethanes includes, for example, reacting the polyisocyanate(s) and hydroxyl terminated intermediate(s) first, followed by a reaction of the resulting product with the chain extender(s).

The weight average molecular weight of the polyurethane is generally at least about 50,000 and typically no more than 500,000, as determined by gel permeation chromatography (GPC). Typically, the polyurethane has a weight average molecular weight in the range of about 90,000 to about 250,000.

Crystallization Promoter—Talc

Talc is added to the polyurethane as a crystallization promoter. Talc is hydrous magnesium silicate which can contain impurities. It is believed that talc provides nucleation sites to promote crystallization of the hard and soft segments of the polyurethane. The talc can be added to polyurethane that has been previously formed or the talc can be added into a reaction vessel or extruder within which the polyurethane reactants have partially or substantially reacted to form the polyurethane, as described below.

Generally, an effective amount of talc is added to obtain an increase in crystallization temperature. The amount of talc added to the polyurethane composition is typically at least about 0.1 wt. % based on the total weight of the polyurethane composition. Too much talc can result in degradation of physical properties of the polyurethane composition such as, for example, strength, durability, flexibility, abrasion resistance, and transparency. Generally, the amount of talc added to the polyurethane composition is no more than about 10 wt. % based on the total weight of the polyurethane composition. Typically, the amount of talc used in the polyurethane composition is about 0.3 to 5 wt. % based on the total weight of the polyurethane composition, and is often 0.5 to 2 wt. %. If necessary (e.g., if the particles are too fine), the talc can be added in a dispersing agent.

A variety of different types of talc can be used. Usable talc products include talc having a mean particle size (e.g., diameter) of no more than about 20 μm and typically no more than 10 μm. Preferably, the mean particle size of the talc is no more than 5 μm. More preferably, at least 75 wt. % of the talc has a particle size of no more than 10 μm. Most preferably, at least 90 wt. % of the talc has a particle size of no more than 10 μm. Talc with a smaller particle size provides a larger surface area for a given weight or volume of talc. The larger surface area provides more nucleation sites per unit weight or volume.

The addition of talc to the polyurethane composition can yield a polyurethane composition with a crystallization temperature that is at least 10 degrees Celsius higher than the same polyurethane composition without talc, as determined by differential scanning calorimetry (DSC) starting at a temperature of 270° C. and decreasing at a rate of 40° C. per minute. In at least some instances, the crystallization temperature of the talc-containing polyurethane composition is, under the measurement conditions described above, at least 20 degrees Celsius or 30 degrees Celsius higher than the same polyurethane composition without talc.

The crystallization temperature can also be measured using other scanning conditions, such as, for example, starting at a temperature of 250° C. and decreasing at a rate of 10° C. or 40° C. per minute or starting at 270° C. and decreasing at rate of 10° C. per minute. Changing the measurement conditions often changes the measured crystallization temperature. Under these measurement conditions, the crystallization temperature of the talc-containing polyurethane composition can be at least 10° C. higher than the crystallization temperature of the same polyurethane composition without talc. In some instances, the crystallization temperature of the talc-containing polyurethane composition can be at least 40 degrees Celsius, 50 degrees Celsius or more higher than the crystallization temperature of the same polyurethane composition without talc.

In some instances, the DSC measurement of crystallization temperature for polyurethane compositions without talc can yield two or more peaks. The higher temperature peaks typically represent portions of the material that are in a state that is more readily crystallized. However, to determine the effect of talc, the crystallization temperature of the talc-containing polyurethane composition should be compared to the lowest crystallization temperature peak for the composition without talc. For many products, it is important that all or substantially all of the polyurethane composition crystallize and the lowest crystallization temperature peak reflects this condition.

The addition of talc can raise the crystallization temperature of the polyurethane compositions described above. These compositions can be used in forming molded articles by injection molding, compression molding, or other molding techniques. The amount of time that the polyurethane composition must remain in the mold depends on a variety of parameters including, for example, the peak molding temperature, the rate at which the temperature is decreased after reaching the peak molding temperature, and the rapidity with which the polyurethane composition crystallizes (e.g., as determined by the crystallization temperature). By adding talc to the polyester-based polyurethane compositions, the crystallization temperature increases and, typically, the amount of time that the composition must remain in the mold decreases for a given set of processing conditions. The decrease in time is a result of the crystallization of the polyurethane composition at a higher temperature. This can result in a decrease in molding cycle time of at least 5% over the molding cycle time for the same polyurethane composition without talc. The molding cycle time is defined as the time period extending from the time of the first introduction of material into the mold to the time that the molded material is removed from the mold. Typically, the decrease in molding cycle time is at least 10% and can be at least 20% or even 40% or more. The decrease in molding cycle time can result in an increase in production rates and/or a decrease in the amount of molding equipment needed to make a given amount of the product.

Talc can be used in polyurethane compositions that are later processed using methods other than molding. Talc-bearing polyurethane compositions are particularly useful in making products by techniques where it is desirable to have rapid set-up of the material. Such techniques include extrusion (e.g., extrusion of cylindrical products) and film formation. Using talc in the polyurethane composition can permit more rapid formation of the products using these techniques.

Other Additives

Other conventional additives can be included in the polyurethane composition. Among these other conventional additives are, for example, antioxidants, antiozone agents, antihydrolysis agents, extrusion aids, UV stabilizers, chain terminators, light stabilizers, colorants, and flame retardants. These additives and their use in polyurethane compositions are generally known. Typically, these additives are used in amounts that achieve a desired effect. Excessive amounts of additives may reduce other properties of the polyurethane composition beyond desired limits.

Antioxidants typically prevent or terminate oxidation reactions that result in degradation of the polyurethane article over the lifetime of the article. Typical antioxidants include ketones, aldehydes, and aryl amines, as well as phenolic compounds. Specific examples of compounds include ethylenebis(oxyethylene)bis(3-t-butyl-4-hydroxy-5-methylcinnamate and tetrakis[methylene(3,5-di-t-butyl-4-hydroxyhydrocinnamate)]methane. Examples of suitable commercial antioxidants include Irganox™ 1010, Irganox™ 1098, Irganox™ 565, and Irganox™ 1035 (Ciba-Geigy Corp., Ardsley, N.Y.).

Antiozone agents prevent or reduce damage caused by ozone and antihydrolysis agents prevent or reduce damage by water and other hydrolyzing compounds. Examples of suitable antiozonants include p-phenylenediamine derivatives. Antihydrolysis agents include, for example, Stabaxol™ P and Stabaxol™ P-200 (Rhein Chemie, Trenton, N.J.).

Extrusion aids facilitate movement of the polyurethane through the extruder. Waxes, such as Wax E (Hoechst-Celanese Corp., Chatham, N.J.), Acrawax™ (Lonza Inc., Fair Lawn, N.J.) and oxidized polyethylene 629A (Allied-Signal Inc., Morristown, N.J.), are suitable extrusion aids. These extrusion aids can also act as mold-release agents or additional mold release agents can be added to the composition.

Chain terminators are used to control molecular weight. Examples of chain terminators include monoalcohol compounds having 8 or more carbon atoms.

Light stabilizers prevent or reduce degradation of a polymer product due to visible or ultraviolet light. Examples of suitable light stabilizers include drometrizole, Tinuvin P (Ciba-Geigy Corp., Ardsley, N.Y.). Suitable UV stabilizers include polyethers and Ketamine™ P (Ciba-Geigy Corp., Ardsley, N.Y.).

Extrusion

The polyurethane composition may be formed and/or processed using a variety of techniques, including extrusion. For extrusion, a variety of processing devices can be used including, for example, single and twin screw extruders. For example, the polyisocyanate(s), the hydroxyl terminated polyester(s), and the optional chain extender(s) are combined and heated within the extruder, as described above. The reaction of these components proceeds as the material advances along the extruder. The one or more chain extenders can be added initially with the other reactants or later, for example, via a port in the extruder. Although individual batches can be formed in reaction or mixing vessels, extrusion processes often allow continuous processing by metered addition of the components into the extruder.

Any of the additives, including the talc, can be added with the components that form the polyurethane. Typically, these additives do not interfere with the reaction of the polyisocyanate(s), hydroxyl terminated polyol(s), and optional chain extender(s), unless the additive is specifically included to react with those components (e.g., the additive is covalently incorporated into the polyurethane).

Alternatively, any of the additives can be added into the extruder further downstream where the polyurethane is at least partially or substantially formed. Extruders typically include one or more ports along the length of the extruder for introduction of such materials. For example, talc can be added at a point in the extruder where at least 75% of the reaction is complete (i.e., where at least 25 wt. % of reactants, based on the original weight of all of the reactants, that form the polyurethane remain unreacted). In some embodiments, the talc is added at a point in the extruder where at least 90% or 95% of the reaction is complete.

The additives, whether added in with the polyurethane reactants or later, are mixed into the polyurethane composition by the extruder. Preferably, talc is added at a point along the extruder that permits substantially uniform dispersion of the talc within the polyurethane composition. This composition continues through the extruder until it is pushed out of the extruder through a die. The composition can be cut, cooled, injection molded, compression molded, molded by other techniques, extruded, or otherwise processed to form polyurethane articles.

Modifications of this process can be made. For example, instead of adding components for forming the polyurethane into the extruder, a previously formed polyurethane can be introduced into the extruder. The talc can be added with the polyurethane or further downstream along the extruder.

Another modification includes mixing the polyurethane or one or more of the components that reacts to form the polyurethane and the talc prior to introduction into an extruder. The mixing can be accomplished using known techniques and devices.

EXAMPLES

Example 1

Formation of Polyester-based Polyurethane with Talc (A) 0.5 wt. % Talc: Into one preheated (70–100° C.) agitated holding tank was charged a hydroxyl terminated polyester formed from a reaction of 1,4-butanediol and adipic acid and having a number average molecular weight of 4200. A second preheated (40–50° C.) agitated holding tank was charged with 1,4-butanediol (Lyondell Chemical Corp., Houston, Tex.). A third preheated (45–50° C.) agitated holding tank was charged with 4,4'-methylenebis-(phenyl isocyanate) (MDI) from ICI Americas (Wilmington, Del.).

A hydroxyl terminated polyester/1,4-butanediol mixture was formed by metering, on a continuous basis, 73.7 parts by weight hydroxyl terminated polyester and 26.3 parts by weight 1,4-butanediol into a static mixer and mixing rapidly. Next, a polyurethane composition was formed by adding, on a continuous basis, 55.6 parts by weight of the hydroxyl terminated polyester/1,4-butanediol mixture and 44.4 parts by weight 4,4'-methylenebis-(phenyl isocyanate) into a self-wiping, twin-screw extruder (Werner & Pfleiderer, Ramsey, N.J.) and heating to 180 to 200° C., although temperatures up to about 220° C. may be reached due to the exothermic nature of the reaction.

Then, 0.5 parts by weight talc (mean particle size 1.7 μm, Mistron Vapor™ talc, Luzenac America, Engelwood, Colo.), 0.75 parts by weight A-C Polyethylene 629A™ (oxidized polyethylene from Allied-Signal, Inc., Morristown, N.J.), 0.75 parts by weight Wax E (Hoechst-Celanese Corp., Chatham, N.J.), and 0.25 parts by weight Stabaxol™ P (Rhein Chemie, Trenton, N.J.) were added to the polyurethane composition (based on the weight of the polyurethane composition) at entry points along the extruder to provide for adequate dispersion of talc. The resulting polyurethane composition was extruded.

(B) 1.0 wt. % Talc: The same procedure was followed except that 1.0 parts by weight talc was used.

(C) 2.0 wt. % Talc: The same procedure was followed except that 2.0 parts by weight talc was used.

Example 2

Formation of Polyester-based Polyurethane without Talc

Into one preheated (70–100° C.) agitated holding tank was charged a hydroxyl terminated polyester formed from a reaction of 1,4-butanediol and adipic acid and having a number average molecular weight of 4200. A second preheated (40–50° C.) agitated holding tank was charged with 1,4-butanediol (Lyondell Chemical Corp., Houston, Tex.). A third preheated (45–50° C.) agitated holding tank was charged with 4,4'-methylenebis-(phenyl isocyanate) (MDI) from ICI Americas (Wilmington, Del.).

A hydroxyl terminated polyester/1,4-butanediol mixture was formed by metering, on a continuous basis, 73.7 parts by weight hydroxyl terminated polyester and 26.3 parts by weight 1,4-butanediol into a static mixer and mixing rapidly. Next, a polyurethane composition was formed by adding, on a continuous basis, 55.6 parts by weight of the hydroxyl terminated polyester/1,4-butanediol mixture and 44.4 parts by weight 4,4'-methylenebis-(phenyl isocyanate) into a twin-screw extruder (Werner & Pfleiderer, Ramsey, N.J.) and heating to 180 to 200° C., although temperatures up to about 220° C. may be reached due to the exothermic nature of the reaction.

Then, 0.75 parts by weight A-C Polyethylene 629A™ (oxidized polyethylene from Allied-Signal, Inc., Morristown, N.J.), 0.75 parts by weight Wax E (Hoechst-Celanese Corp., Chatham, N.J.), and 0.25 parts by weight Stabaxol™ P (Rhein Chemie, Trenton, N.J.) were added to the polyurethane composition (based on the total weight of the polyurethane composition) at entry points along the extruder to provide for adequate dispersion of talc. The resulting polyurethane composition was extruded.

Example 3

Formation of Polyether-based Polyurethane with Talc

Into one preheated (90° C.) agitated holding tank was charged Arcol R-2835 polyether (Arco Chemical Co., Newtown Square, Pa.) having a number average molecular weight of 1360. A second preheated (40–50° C.) agitated holding tank was charged with 1,4-butanediol (Lyondell Chemical Corp., Houston, Tex.). A third preheated (45–50° C.) agitated holding tank was charged with 4,4'-methylenebis-(phenyl isocyanate) (MDI) from ICI Americas (Wilmington, Del.).

A hydroxyl terminated polyether/1,4-butanediol mixture was formed by metering, on a continuous basis, 345.43 parts by weight hydroxyl terminated polyether, 1.08 parts by weight Irganox™ 245 (with the hydroxyl terminated polyether), 104.57 parts by weight 1,4-butanediol, and 46.8 ppm of the catalyst tin octanoate into a static mixer and mixing rapidly. Next, a polyurethane composition was formed by adding, on a continuous basis, 200.00 parts by weight of the hydroxyl terminated polyether/1,4-butanediol mixture and 100.21 parts by weight 4,4'-methylenebis-(phenyl isocyanate) into a twin-screw extruder (Werner & Pfleiderer, Ramsey, N.J.) and heating to 180 to 200° C., although temperatures up to about 220° C. may be reached due to the exothermic nature of the reaction.

Then, 7.32 parts by weight talc was added to the polyurethane composition (based on the total weight of the polyurethane composition) at entry points along the extruder to provide for adequate dispersion of talc. The resulting polyurethane composition was extruded.

Example 4

Formation of Polyether-based Polyurethane without Talc

Into one preheated (90° C.) agitated holding tank was charged Arcol R-2835 polyether (Arco Chemical Co., Newtown Square, Pa.) having a number average molecular weight of 1360. A second preheated (40–50° C.) agitated holding tank was charged with 1,4-butanediol (Lyondell Chemical Corp., Houston, Tex.). A third preheated (45–50° C.) agitated holding tank was charged with 4,4'-methylenebis-(phenyl isocyanate) (MDI) from ICI Americas (Wilmington, Del.).

A hydroxyl terminated polyether/1,4-butanediol mixture was formed by metering, on a continuous basis, 345.43 parts by weight hydroxyl terminated polyether, 1.08 parts by weight Irganox™ 245 (in the hydroxyl terminated polyether), 104.57 parts by weight 1,4-butanediol, and 46.8 ppm (based on the total weight of the polymer) of the catalyst tin octanoate into a static mixer and mixing rapidly. Next, a polyurethane composition was formed by adding, on a continuous basis, 200.00 parts by weight of the hydroxyl terminated polyether/1,4-butanediol mixture and 100.21 parts by weight 4,4'-methylenebis-(phenyl isocyanate) into a twin-screw extruder (Werner & Pfleiderer, Ramsey, N.J.) and heating to 180 to 200° C., although temperatures up to about 220° C. may be reached due to the exothermic nature of the reaction. The resulting polyurethane composition was extruded.

Example 5

Formation of Polyether-based Polyurethane with Talc (A) 0.5 wt. % Talc: Into one preheated agitated holding tank was charged polytetramethylene glycol (E.I. duPont de Nemours & Co., Wilmington, Del.) having a number average molecular weight of 1000. A second preheated (40–50° C.) agitated holding tank was charged with 1,4-butanediol (Lyondell Chemical Corp., Houston, Tex. A third preheated (45–50° C.) agitated holding tank was charged with 4,4'-methylenebis-(phenyl isocyanate) (MDI) from ICI Americas (Wilmington, Del.).

A hydroxyl terminated polyether/1,4-butanediol mixture was formed by metering, on a continuous basis, 1004.79 parts by weight hydroxyl terminated polyether, 1.06 parts by weight Tinuvin™ P (in the hydroxyl terminated polyether), 0.88 parts by weight Wax E (in the hydroxyl terminated polyether), 245.21 parts by weight 1,4-butanediol, and 40 to 50 ppm (based on the total weight of the polyurethane) of tin octanoate catalyst (25% conc. in polytetramethylene glycol) into a static mixer and mixing rapidly. Next, a polyurethane composition was formed by adding, on a continuous basis, 200.00 parts by weight of the hydroxyl terminated polyether/1,4-butanediol mixture and about 150 parts by weight 4,4'-methylenebis-(phenyl isocyanate) into a twin-screw extruder (Werner & Pfleiderer, Ramsey, N.J.) and heating to 180 to 200° C., although temperatures up to about 220° C. may be reached due to the exothermic nature of the reaction.

Next, 1.78 parts by weight (corresponding to 0.5 wt. % of the polyurethane composition) talc was added to the polyurethane composition at entry points along the extruder to provide for adequate dispersion of talc. The resulting polyurethane composition was extruded.

(B) 1.0 wt. % Talc: The same procedure was followed except that 3.56 parts by weight (corresponding to 1.0 wt. % of the total polyurethane composition) talc was used.

(C) 1.5 wt. % Talc: The same procedure was followed except that 5.34 parts by weight (corresponding to 1.5 wt. % of the total polyurethane composition) talc was used.

Example 6

Formation of Polyether-based Polyurethane without Talc

Into one preheated agitated holding tank was charged polytetramethylene glycol (E.I. duPont de Nemours & Co., Wilmington, Del.) having a number average molecular weight of 1000. A second preheated (40–50° C.) agitated holding tank was charged with 1,4-butanediol (Lyondell Chemical Corp., Houston, Tex.). A third preheated (45–50° C.) agitated holding tank was charged with 4,4'-methylenebis-(phenyl isocyanate) (MDI) from ICI Americas (Wilmington, Del.).

A hydroxyl terminated polyether/1,4-butanediol mixture was formed by metering, on a continuous basis, 1004.79 parts by weight hydroxyl terminated polyether, 1.06 parts by weight Tinuvin™ P (in the hydroxyl terminated polyether), 0.88 parts by weight Wax E (in the hydroxyl terminated polyether), 245.21 parts by weight 1,4-butanediol, and 40 to 50 ppm (based on the total weight of the polyurethane) of tin octanoate catalyst (25% conc. in polytetramethylene glycol) into a static mixer and mixing rapidly. Next, a polyurethane composition was formed by adding, on a continuous basis, 200.00 parts by weight of the hydroxyl terminated polyether/1,4-butanediol mixture and about 150 parts by weight of 4,4'-methylenebis-(phenyl isocyanate) into a twin-screw extruder (Werner & Pfleiderer, Ramsey, N.J.) and heating to 180 to 200° C., although temperatures up to about 220° C. may be reached due to the exothermic nature of the reaction. The resulting polyurethane composition was extruded.

Example 7

Measurement of Crystallization Temperature

A 10–20 mg portion of each of the polyurethane compositions was individually placed in a differential scanning calorimeter (available from, for example, Mettler-Toledo Co., Greifensee, Switzerland) and heated to a temperature of 270° C. or 250° C. This temperature was held for 3 to 4 minutes. The temperature was then decreased at a rate of 10 or 40° C./minute. The amount of heat adsorbed or emitted by the sample is recorded as a function of temperature, peak positions corresponding to the crystallization temperature of the sample. The measured crystallization temperatures for the polyurethane compositions of Examples 1–6 are provided in Table 1.

TABLE 1

Crystallization Temperatures

| Example | Polyol | Talc (wt. %) | Crystallization Temperature (° C.) | | | |
|---|---|---|---|---|---|---|
| | | | 270° C. 10° C./min | 270° C. 40° C./min | 250° C. 10° C./min | 250° C. 40° C./min |
| 1(A) | Polyester | 0.5 | 148.44 | 129.83 | 152.35 | 139.94 |
| 1(B) | | 1.0 | 154.10 | 137.05 | 175.92 | 146.06 |
| 1(C) | | 2.0 | 151.31 | 133.50 | 167.92 | 147.28 |
| 2 | Polyester | 0.0 | 123.58 | 104.64 | 118.09 | 113.51 |
| | | | | | 141.43 | 141.69 |
| 3 | Polyether | 2.5 | | | | 98.8 |
| 4 | Polyether | 0.0 | | | | 99.3 |
| 5(A) | Polyether | 0.5 | | | | 89.9 |
| 5(B) | | 1.0 | | | | 90.3 |
| 5(C) | | 1.5 | | | | 90.0 |
| 6 | Polyether | 0.0 | | | | 92.7 |

When talc was added to the polyester-based polyurethane, there was an increase in the crystallization temperature (using the lowest measured crystallization temperature) of at least 20 degrees Celsius for all four DSC scanning conditions. In contrast, there was little or no change in the crystallization temperature of the polyether-based polyurethane compositions.

Two crystallization temperatures were measured for the polyester-based polyurethane composition of Example 2 when the DSC scans started at 250° C. The presence of these two temperatures indicates that there can be two phases in the polyurethane composition. One phase can be more ordered with a higher crystallization temperature. The other phase can be less ordered and have a lower crystallization temperature. When molding, it is generally important that the most or all of the material crystallize quickly. Thus, the enhancement due to talc should be determined using the lower of the two measured crystallization temperatures which indicates that all of the material has crystallized.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

What is claimed is:

1. A polyurethane composition comprising:
   a polyurethane component consisting essentially of a polyester-based polyurethane; and
   talc in an amount of about 0.2 to about 4 wt. % based on the total weight of the polyurethane composition, wherein the polyurethane composition has a crystallization temperature that is at least 10° C. greater than a crystallization temperature of the same polyurethane composition without talc, as measured by differential scanning calorimetry starting at a temperature of 250° C. and decreasing at a rate of 40° C. per minute, and wherein said talc has a mean particle size no more than 20 μm.

2. The polyurethane composition of claim 1, wherein the polyurethane composition has a crystallization temperature of at least 10 degrees Celsius greater than a crystallization temperature of the same polyurethane composition without talc, as measured by differential scanning calorimetry starting at a temperature of 270° C. and decreasing at a rate of 40° C. per minute.

3. The polyurethane composition of claim 1, wherein the polyurethane composition has a crystallization temperature of at least 10 degrees Celsius greater than a crystallization temperature of the same polyurethane composition without talc as measured by differential scanning calorimetry starting at a temperature of 270° C. and decreasing at a rate of 10° C. per minute.

4. The polyurethane composition of claim 1, wherein the polyurethane composition has a crystallization temperature of at least about 140° C. as measured by differential scanning calorimetry starting at a temperature of 250° C. and decreasing at a rate of 40° C. per minute.

5. The polyurethane composition of claim 1, wherein the polyurethane composition comprises talc in an amount of 0.5 to 2 wt. % based on the total weight of the polyurethane composition.

6. The polyurethane composition of claim 1, wherein the polyurethane is formed by reacting at least one hydroxyl terminated polyol, at least one polyisocyanate compound, and at least one chain extender compound, and wherein the at least one polyisocyanate compound comprises at least one compound selected from the group consisting of 4,4'-methylenebis-(phenylisocyanate), phenylene-1,4-diisocyanate, 1,5-naphthalene diisocyanate, 1,4-cyclohexyl diisocyanate, and trans-dicyclohexylmethane diisocyanate.

7. The polyurethane composition of claim 1, wherein the talc has an average particle size of no more than about 5 μm.

8. A method of preparing a polyurethane composition, the method comprising steps of:
    combining a polyurethane component consisting essentially of a polyester based polyurethane with talc to form the polyurethane composition, wherein the polyurethane composition comprises talc in an amount of about 0.2 to about 4 wt. % based on the total weight of the polyurethane composition, and wherein the polyurethane composition has a crystallization temperature that is at least 10° C. greater than a crystallization temperature of the same polyurethane composition without talc, as measured by differential scanning calorimetry starting at a temperature of 250° C. and decreasing at a rate of 40° C. per minute, and wherein said talc has a mean particle size no more than 20 μm.

9. The method of claim 8, wherein the step of combining said polyurethane component with talc comprises combining the polyurethane component and the talc in an extruder.

10. The method of claim 9, further comprising a step of extruding the polyurethane composition from the extruder.

11. The method of claim 8, further comprising a step of crystallizing the polyurethane composition.

12. The method of claim 8, further comprising a step of molding the polyurethane composition.

13. The method of claim 8, wherein the combining step comprises a step of reacting at least one polyisocyanate and at least one hydroxyl terminated polyester to form the polyurethane.

14. The method of claim 13, wherein the combining step further comprises a step of adding the talc after forming at least a portion of the polyurethane.

15. The method of claim 13, wherein the reacting step comprises a step of reacting at least one polyisocyanate, at least one hydroxyl terminated polyester, and at least one chain extender to form the polyurethane.

16. A molded article comprising:
    a polyurethane composition including
    a polyurethane component consisting essentially of a polyester-based polyurethane; and
    talc in an amount of about 0.2 to about 4 wt. % based on the total weight of the polyurethane composition, wherein the polyurethane composition has a crystallization temperature that is at least 10° C. greater than a crystallization temperature of the same polyurethane composition without talc, as measured by differential scanning calorimetry starting at a temperature of 250° C. and decreasing at a rate of 40° C. per minute, and wherein said talc has a mean particle size no more than 20 μm.

17. The molded article of claim 16, wherein the polyurethane composition has a crystallization temperature of at least about 140° C. as measured by differential scanning calorimetry starting at a temperature of 250° C. and decreasing at a rate of 40° C. per minute.

18. A method of increasing the crystallization temperature of a polyurethane composition, the method comprising a step of:
    adding up to about 4 wt. % talc, based on the total weight of the polyurethane composition, to a polyurethane composition consisting essentially of a polyester-based polyurethane.

19. The method of claim 18, wherein the polyurethane composition comprises polyurethane when the talc is added to the polyurethane composition.

* * * * *